May 20, 1969     F. M. SCHENSTROM     3,445,765
APPARATUS FOR MEASURING RESISTANCE BETWEEN TWO NODES
INCLUDING A TRANSPARENT MASK MOUNTED ON
THE FACE OF AN OSCILLOSCOPE

Filed Sept. 20, 1966     Sheet 1 of 3

INVENTOR.
Frank M. Schenstrom,
By L. E. Carnahan
AGENT

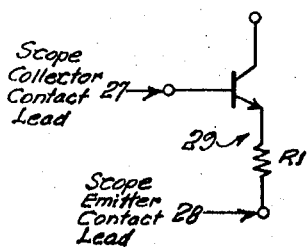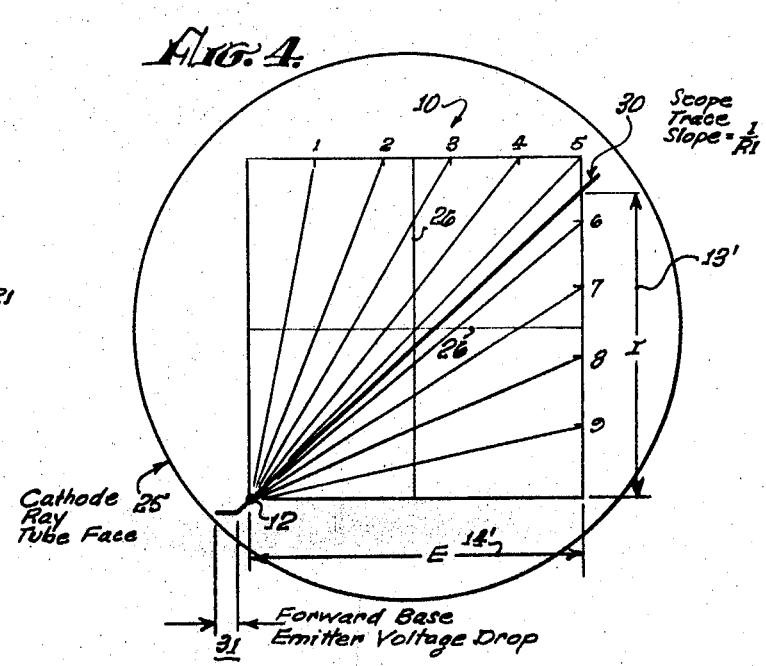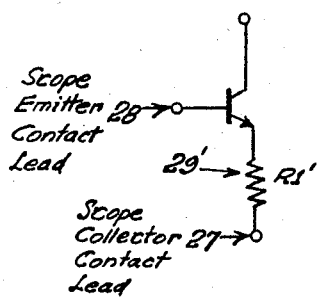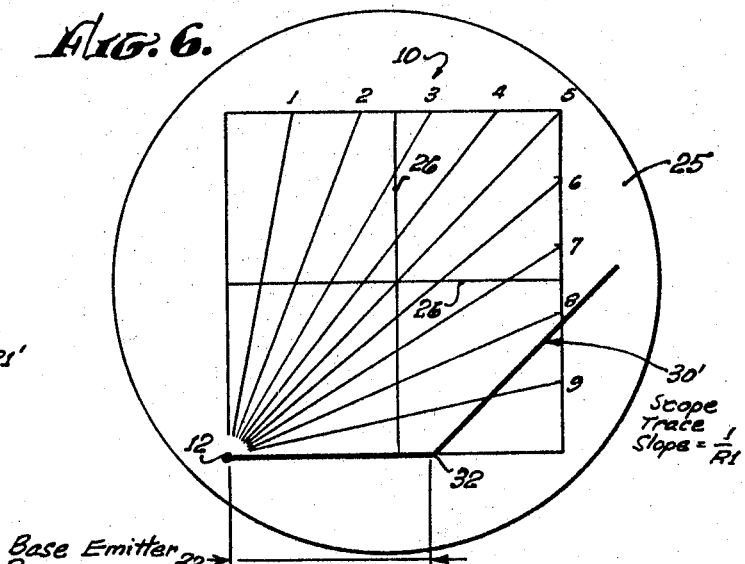

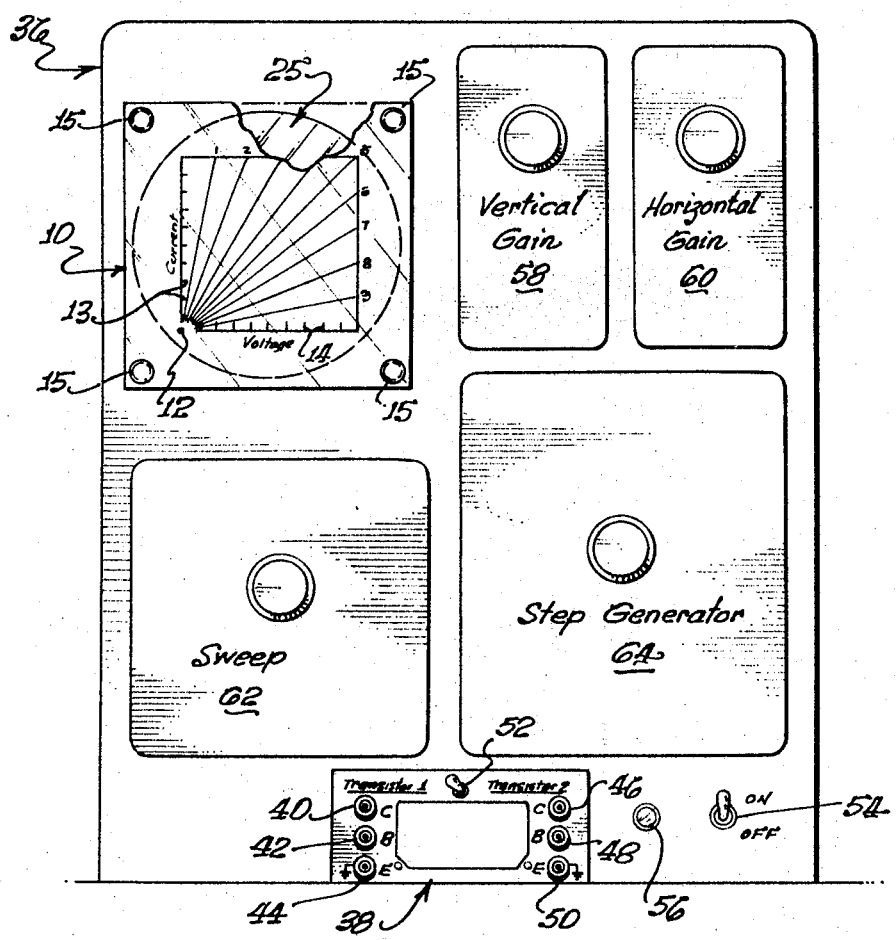

United States Patent Office 3,445,765
Patented May 20, 1969

3,445,765
APPARATUS FOR MEASURING RESISTANCE BETWEEN TWO NODES INCLUDING A TRANSPARENT MASK MOUNTED ON THE FACE OF AN OSCILLOSCOPE
Frank M. Schenstrom, Cupertino, Calif., assignor to General Dynamics Corporation, a corporation of Delaware
Filed Sept. 20, 1966, Ser. No. 580,680
Int. Cl. G01r 27/08, 13/20
U.S. Cl. 324—62    4 Claims

ABSTRACT OF THE DISCLOSURE

A transparent plastic sheet having a resistance graticule pattern of uniformly spaced reference lines inscribed thereon is mounted over the face of an oscilloscopic instrument and combined with an associated resistance chart to provide a rapid visual means for measuring resistance between two nodes, for example, in a transistor circuit network.

---

During the course of electrical testing and more particularly in troubleshooting electrical circuits, it is necessary to determine which components or connections are defective within a given circuit. In some cases it is difficult to determine the status of a given component with conventional means (voltmeters, ammeters, ohmmeters, etc.) when there are a limited number of nodes available for testing purposes. This is especially true with circuits that have been encapsulated into modular form or with semiconductor integrated circuits, where individual components cannot be easily isolated from the rest of the circuitry.

In the case of encapsulated modular circuits consisting of discrete components, a rapid means of determining the defective component without destructive testing or disassembly of the module is desired. In many cases if the actual defective component within a module can be determined, only that portion of the module has to be disassembled. This may permit repairs to be made on the module. In other cases, for failure analysis purposes, it is necessary to rapidly locate the actual defective component or connection so that corrective action can be initiated in the assembly processes.

In the case of semiconductor integrated circuits, there are also a limited number of nodes available for testing purposes and the circuits cannot be disassembled. Therefore, the only reason for testing inoperative devices is for failure analysis purposes.

Therefore, it is an object of this invention to provide a means for aiding in the measurement of electrical parameters of circuits.

A further object of the invention is to provide a means with reference lines inscribed thereon for the purposes of aiding in the measurement of electrical parameters of circuits.

Another object of the invention is to provide visual means for measuring the resistance between two nodes when conventional instruments will not provide the correct readings.

Another object of the invention is to provide a unique and simple means of determining the resistance between two nodes when there are active components within the network that prohibit accurate resistance measurements to be made with conventional ohmmeters or other instruments.

Other objects of the invention not set forth above will become readily apparent from the following description and accompanying drawings wherein:

FIG. 3 and FIG. 5 are schematic illustrations of a simple circuit in which the value of resistors are determined to illustrate the invention; and FIGS. 4 and 6 are visual presentations of the measurement of the FIGS. 3 and 5 embodiments with the aid of the inventive graticule.

FIGURE 7 is a simplified front view of an oscilloscopic instrument showing the resistance graticule pattern of FIGURE 1 mounted on the cathode ray tube face thereof.

Broadly, the invention is directed to a resistance graticule and a resistance chart combined with an oscilloscopic instrument to measure the resistance between two nodes in a transistor circuit network, for example. More particularly, the disclosed device comprises a thin transparent sheet of plastic having a pattern of uniformly spaced reference lines inscribed therein whose slopes correspond to the reciprocal of resistance and which diverge from a zero reference point at the bottom left corner of said graticule, and current calibration marks and voltage calibration marks inscribed on the left and bottom edges of said graticule, respectively. A resistance chart to accompany said graticule and correspond to said reference lines is prepared to effect resistance measurements. Operationally, said graticule is mounted and appropriately aligned on the face of the CRT of a transistor curve tracer with a rectangular spaced grid pattern graticule. A trace appearing on the face of said curve tracer when the collector and emitter leads of said tracer are applied as test probes to a pair of circuit nodes is viewed through the resistance graticule and the resistance between said nodes is determined by observing the proximity of said traces to the individual reference lines and by making reference to said chart.

Figure 1:
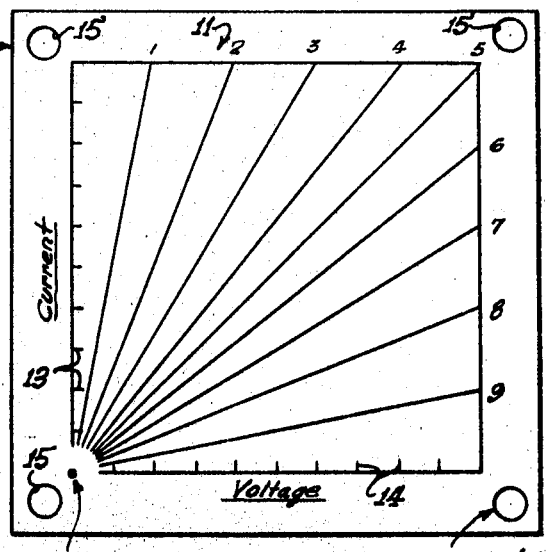
FIG. 1 is a view of a physical layout illustarting an embodiment of the resistance graticule of the invention.

The embodiment of the resistance graticule of the invention as shown in FIG. 1 is constructed of a thin transparent sheet 10 of plastic or other transparent material and provided with a pattern 11 of uniformly spaced reference lines, indicated at 1–9, inscribed therein whose slopes correspond to the reciprocal of resistance and which diverge from a zero reference point or dot 12 at the bottom left corner of said pattern 11. The current calibration marks 13 and voltage calibration marks 14 are inscribed on the left and bottom edges, respectively, of pattern 11. Sheet 10 is provided with a plurality of mounting holes 15, four such holes being utilized in this embodiment.

Figure 2:
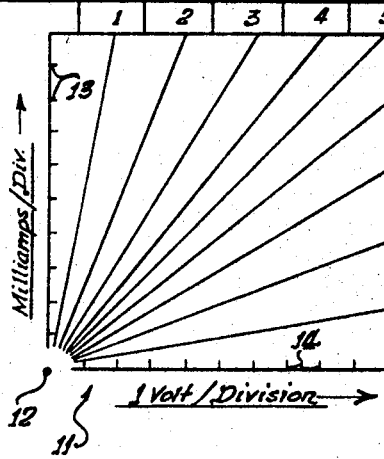
FIG. 2 is a view illustrating a chart showing resistance measurements obtained from the FIG. 1 graticule.

The value of resistance is determined by horizontal and vertical calibration curves as indicated in FIG. 2 wherein the graticule is combined with a calibration chart for a one volt per division on the horizontal setting 14 and a milliamp per division on the vertical setting 13. The chart of FIG. 2 is generally indicated at 20 and is provided at the bottom 21 and left side 22 with values in milliamps/division while the remainder is set off at 23 and 24 in values of resistance in ohms.

The resistance graticule of this invention may be utilized with, for example, a Tektronix Inc. Type 575 Transistor Curve Tracer. The resistance graticule 10 is mounted on the face of the cathode ray tube (CRT) 25 of the transistor curve tracer (FIGS. 4 and 6) along with a rectangular spaced grid pattern graticule 26 supplied by the instrument maker. The resistance graticule horizontal and vertical axis lines 14 and 13, respectively, are lined up with the rectangular grid graticule 26, which permits the horizontal and vertical axis of the resistance graticule to be calibrated with the controls and visual display of the curve tracer. The visual display and controls of the curve tracer are calibrated and positioned in a manner so that the vertical axis corresponds to current and the horizontal axis corresponds to voltage. A representative oscilloscopic instrument or curve tracer 36 is shown in simplified form in FIG. 7 and illustrates how the resistance graticule sheet 10 is mounted over the CRT face 25 via the mounting holes 15 provided in the sheet 10. Verticle gain 58, horizontal gain 60, sweep 62, and step generator 64 are typical controls for controlling the visual display which appears on the CRT face 25. Operation of such controls is well-known to those skilled in the art. A test panel 38 is provided with the instrument for connection to transistor circuit networks under test. In the particular embodiment shown, the test panel 38 has two identical sets of binding posts for connection to two separate transistor circuits. Binding posts 40, 42 and 44 comprise one set for connection, respectively, to the collector (C), base (B) and emitter (E) of a transistor in a circuit network under test. Similarly, binding posts 46, 48 and 50 comprise the second set for connection, respectively, to the collector (C), base (B) and emitter (E) of another transistor in a circuit network under test. A toggle switch 52 in the upper center portion of the test panel is actuated to select either set of binding posts as desired, with one position of the switch designated "Transistor 1" and the other, "Transistor 2." Connections from oscilloscopic instruments to circuits under test are usually made by means of test probes or leads, as is well-known by those skilled in the art, and, in the instant case, two of such probes or leads are indicated in FIGURES 3 and 5 as collector and emitter leads 27 and 28, respectively, to help illustrate in a simple manner the test example hereinafter described. By way of example, the collector and emitter leads 27 and 28 may be connected to binding posts 40 and 44, respectively, on the test panel 38. To the right of the test panel 38 is an indicator light 56 which is turned on by activation of an ON-OFF power switch 54 to the "ON" position, thus indicating that line voltage has been applied to the oscilloscopic instrument in the usual manner.

As seen in FIG. 3, the collector and emitter leads 27 and 28, respectively, are brought out from the instrument and used as test probes. When the leads 27 and 28 are connected to the circuit indicated generally at 29 as shown in FIG. 3, a visual presentation, scope trace 30, is presented on the face of the CRT 25 as shown in FIG. 4. The slope of the scope trace 30 corresponds to I divided by E as indicated at 13' and 14', respectively, as shown in FIG. 4. The reciprocal of this slope permits the value of the resistance to be determined. The forward base emitter voltage drop of the transistor of circuit 29 is indicated at 31 in FIG. 4. The controls of the curve tracer permit shifting of the electron beam without loss of calibration, so that the linear portion of the slope crosses the zero reference dot 12 at the bottom left hand position of the resistance graticule 10. The forward base emitter voltage drop of the transistor prohibits measuring accurately the value of R1 of circuit 29 with conventional instruments such as ohmmeters. The reciprocal of the oscilloscope slope trace 30, depending on the settings of the instrument controls, determines the value of the R1 in circuit 29. For example, if the horizontal control is set at 1 volt per division of voltage calibration 14 and the vertical control is set at 0.5 milliamp per division of current calibration 13 the value of R1 of circuit 29 can be determined from the chart 20 shown in FIG. 2. The scope trace 30 lies between number 5 and 6 reference lines of the resistance graticule 10. The chart 20 indicates that the value of R1 lies between 2000 and 2500 ohms. A closer approximation can be made by estimating that the number on the resistance graticule 10 is 5.6. Therefore, R1 is approximately 2000 ohms plus 0.6 (500) or 2300 ohms. This is obtained by taking the difference between values of resistance as indicated by the chart 20 and multiplying that value by the estimated fractional part between the two reference numbers 5 and 6 of the pattern 11 of graticule 10. A more accurate reading can be obtained by positioning the vertical control so that the trace 30 is placed within the first five reference numbers of the resistance graticule and thus utilizing the portion of chart 20 which is positioned above graticule 10 as shown in FIG. 2. In addition, these first five divisions can be more finely divided so that fractional parts between the major divisions can be more readily determined.

The resistance chart 20 of FIG. 2 could be, if desired, inscribed onto the resistance graticule 10 or on a separate chart with lights that would light up the different rows and columns, depending upon the control settings. The lights would light up the desired row and column corresponding to the desired position of the controls.

Referring now to FIGS. 5 and 6, the collector and emitter leads 27 and 28, respectively, are attached to the circuit 29' in a reverse manner and a visual observation of such a reverse hookup is shown by scope trace slope 30' on the CRT 25. The breakpoint 32 on the curve 30' indicates the reverse breakdown voltage, indicated at 33, of the base emitter junction of the transistor of circuit 29'. The value of R1' of circuit 29' can be determined by repositioning the beam so that the sloped portion of the trace 30' is placed over the calibration reference dot 12 on the resistance graticule and then referring to the chart 20 as described above.

While FIGS. 3 and 5 illustrated relatively simple circuits, resistance values between two nodes of more complex circuitry can be determined with the aid of the inventive resistance graticule.

The resistance graticule illustrated may not work properly in all applications when there are reactive elements, such as capacitors and inductors, included within the circuitry. In this type of application different waveforms are obtained depending on the reactance of the storage elements to the stimulus of the applied voltage between the leads. Since, for example, the output of the Tektronix type 575 Transistor Curve Tracer is a full wave rectified waveform at a repetition rate of 120 cycles per second, the reactance of the storage element must be considered at this frequency. For instance, if a capacitor is in parallel with a resistor whose resistance is to be determined, the impedance of the capacitor at 120 c.p.s. must be much larger than the valve of the resistance to obtain the desired slope. If the impedance of the capacitor is approximately the same as that of the resistor, then a distorted elliptical pattern will be observed, in which the major axis will have a slope approximately equal to the reciprocal of resistance. If the capacitive reactance is much smaller than the valve of resistance then the visual observation of an offset short circuit will appear. Various other waveforms will be obtained depending upon the reactive nature of the circuit being invesigated to the applied stimulus.

Should an oscilloscope be designed and fabricated that would utilize the above ideas for visual circuit analysis purposes, such an instrument would provide a variable frequency stimulus in order to avoid the problems associated with reactive components. However, such an oscilloscopic instrument is not presently known.

It has thus been shown that this invention provides a visual means of measuring the resistance between two nodes when conventional instruments will not provide the correct readings.

What I claim is:

1. Apparatus for measuring the resistance between two nodes comprising, in combination, a thin transparent sheet of plastic material having a resistence graticule pattern inscribed thereon, said transparent sheet having a plurality of apertures for mounting said sheet, said pattern including uniformly spaced reference lines, said reference lines having slopes corresponding to the reciprocal of resistance and which diverge from a zero reference point located toward the lower left corner of said pattern, current calibration marks being inscribed on said transparent sheet at the left side of said pattern, voltage calibration marks inscribed on said transparent sheet at the bottom of said pattern, an oscilloscopic instrument having a cathode ray tube face thereon, said transparent sheet being mounted by way of said plurality of apertures on said face such that the current calibration marks and the voltage calibration marks of said resistance graticule pattern are respectively aligned vertically and horizontally on said instrument face which permits the calibration of said marks with the controls and visual display of said instrument, a resistance chart, said chart including portions aligned with said calibration marks of said pattern defining milliamps and portions defining resistance in ohms aligned with said reference lines of said pattern, whereby upon connection of said oscilloscopic instrument to an associated transistor circuit network to be checked a visual presentation will be shown on said instrument by an electron beam having a slope trace, and whereby the controls of said instrument permit shifting of the electron beam so that the linear portion of the trace crosses said zero reference point of said resistance graticule pattern and the sloped portion of the trace extends in the general direction of one of said reference lines, thus illustrating the reciprocal of the resistance of the associated circuit being checked, and also whereby the resistance value of the associated circuit being checked can be readily determined by the value of the milliamp portion of said resistance chart at which the vertical control of said instrument is set and by reading the resistance value on said chart which corresponds to the milliamp setting and the closest of said reference lines to which said sloped portion of said trace extends.

2. The combination defined in claim 1, wherein said resistance chart is inscribed on said transparent sheet about said pattern.

3. The combination defined in claim 5, wehrein said milliamp defining portions of said chart are located at the left and lower sides thereof and adapted to be aligned with said current and voltage calibration marks of said resistance graticule pattern, said resistance defining portions of said chart each including subdivisions having different current values therein, the current values of said subdivisions of said milliamp portions being the same in each of said portions, certain of said resistance definng portons of said chart being located above said resistance graticule pattern and certain portions located to the right of said pattern.

4. The combination defined in claim 1, wherein said reference lines of said pattern are nine in number, the fifth of said nine reference lines terminating at the upper right corner of said pattern, said resistance chart having two portions indicating milliamp values, one of said milliamps indicating portions vertically aligning with said current calibration marks of said graticule pattern, the other of said milliamp indicating portions horizontally aligning with said voltage calibration marks of said graticule pattern, said resistance chart also having ten portions indicating resistance values in ohms, five of said resistance indicating portions being horizontally aligned with said one of said milliamp indicating portions of said chart and vertically aligned with the first through the fifth of said reference lines of said graticule pattern, the other five of said resistance indicating portions being vertically aligned with said other of said milliamp indicating portions of said chart and horizontally aligned with the fifth through ninth of said reference lines of said graticule pattern.

References Cited

UNITED STATES PATENTS 3,059,183  10/1962  McCallister _____ 324—158

OTHER REFERENCES

Haegele, "Visual Transistor Test Method," Sylvania Technologist, vol. IV, No. 3, July 1951, pp. 61–64.

EDWARD E. KUBASIEWICZ, *Primary Examiner.*

US. Cl. X.R.

324—121, 158